(12) United States Patent
Ginsberg et al.

(10) Patent No.: US 7,921,219 B2
(45) Date of Patent: Apr. 5, 2011

(54) MAINTAINING PROTOCOL ADJACENCY STATE WITH FORWARDING FAILURE

(75) Inventors: Lester Ginsberg, Mt. Hermon, CA (US); Abhay Roy, Cupertino, CA (US); Christian Hopps, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 12/229,049

(22) Filed: Aug. 19, 2008

(65) Prior Publication Data

US 2010/0049868 A1 Feb. 25, 2010

(51) Int. Cl.
G06F 15/16 (2006.01)

(52) U.S. Cl. ........ 709/230; 709/203; 709/220; 709/224; 709/238; 370/235; 370/237; 370/238; 370/351; 370/355; 370/356

(58) Field of Classification Search .................. 709/203, 709/220, 224, 230, 238; 370/235, 237, 238, 370/351, 355, 356
See application file for complete search history.

(56) References Cited

U.S. PATENT DOCUMENTS

| | | | |
|---|---|---|---|
| 7,318,108 B2 * | 1/2008 | Sreekantiah et al. | 709/242 |
| 7,561,527 B1 * | 7/2009 | Katz et al. | 370/241 |
| 7,668,971 B2 * | 2/2010 | Vasseur et al. | 709/238 |
| 2006/0209685 A1 * | 9/2006 | Rahman et al. | 370/229 |
| 2007/0180105 A1 | 8/2007 | Filsfils et al. | |
| 2007/0245034 A1 * | 10/2007 | Retana et al. | 709/238 |
| 2008/0065760 A1 * | 3/2008 | Damm et al. | 709/224 |
| 2008/0195733 A1 * | 8/2008 | Detienne et al. | 709/224 |
| 2009/0046579 A1 * | 2/2009 | Lu et al. | 370/225 |
| 2009/0210522 A1 * | 8/2009 | Droms et al. | 709/222 |
| 2010/0023632 A1 * | 1/2010 | Liu | 709/230 |
| 2010/0049868 A1 * | 2/2010 | Ginsberg et al. | 709/242 |

OTHER PUBLICATIONS

D. Katz et al., "RFC 3373—Three-Way Handshake for Intermediate System to Intermediate System (IS-IS) Point-to-Point Adjacencies", Network Working Group, Sep. 2002.
C. Hopps et al., "IS-IS BFD Enabled TLV", draft-ietf-isis-bfd-tlv-01, IETF, Mar. 23, 2008.
C. Hopps, "IS-IS BFD Enabled TLV", draft-chopps-isis-bfd-tlv-00.txt, IETF, Mar. 20, 2005.
D. Katz et al., "Bidirectional Forwarding Detection", draft=ietf-base-08.txt, IETF, Mar. 2008.

* cited by examiner

*Primary Examiner* — Michael Won
(74) *Attorney, Agent, or Firm* — Cindy Kaplan

(57) ABSTRACT

In one embodiment, a method generally includes establishing a routing protocol peer relationship and a Bidirectional Forwarding Detection (BFD) session with a neighbor node, receiving a DOWN BFD event signal from the neighbor node, and maintaining a routing protocol adjacency down state following successful exchange of routing protocol packets with the neighbor node. An apparatus for maintaining protocol adjacency state with a forwarding failure is also disclosed.

20 Claims, 6 Drawing Sheets

TABLE I

| BFD_SESSION_STATE | SD-BFD-CLIENT |
|---|---|
| UNKNOWN | Ignore |
| UP | Ignore |
| DOWN | Neighbor Unreachable |
| ADMIN_DOWN | Ignore |

FIGURE 3

TABLE II

*BFD EVENT*

| ADJ STATE | DOWN | UP | ADMIN_DOWN |
|---|---|---|---|
| Down | Down | Down | Down |
| Initializing | Initializing | Initializing | Initializing |
| Up | Up | Up-BFD | Up |
| Up-BFD | Down-BFD | Up-BFD | Up |
| Down-BFD | Down-BFD | Up-BFD | Up |

FIGURE 4

TABLE III

*Received Adjacency Three-Way State*

| Adjacency state | Down | Initializing | Up |
|---|---|---|---|
| Down | Initialize | Up | Down |
| Initializing | Initialize | Up | Up |
| Up/Up-BFD | Initialize | Accept | Accept |
| Down-BFD | Accept Down-BFD | Accept Down-BFD | Accept Down-BFD |

FIGURE 5

MAINTAINING PROTOCOL ADJACENCY STATE WITH FORWARDING FAILURE

BACKGROUND OF THE INVENTION

The present disclosure relates generally to communication networks, and more particularly, to maintaining protocol adjacency state with a forwarding failure.

Bidirectional Forwarding Detection (BFD) is a protocol used to provide rapid failure detection between network devices. BFD detects faults in the bidirectional path between two forwarding engines, including physical interfaces, sub-interfaces, data links, and to the extent possible the forwarding engines themselves. The network devices may be configured to support various routing protocols including, for example, IS-IS (Intermediate System-to-Intermediate System), or OSPF (Open Shortest Path First).

For routing protocols whose packets do not share fate with BFD packets (e.g., IS-IS or OSPFv3 supporting IPv4), it is possible that the BFD session fails indicating a real forwarding failure, but the protocol neighbor merely flaps (i.e., goes down due to the BFD down notification but then is restored since the forwarding problem does not impact delivery of the routing protocol packets). This results in a loss of data packets and thus impacts Quality of Service (QoS) and network reliability.

BRIEF DESCRIPTION OF THE DRAWINGS

FIG. 3 is a table illustrating actions taken by a self-discovery BFD client when BFD events are signaled locally.

FIG. 4 is a state table illustrating the processing of BFD events.

FIG. 5 is an adjacency state table.

Corresponding reference characters indicate corresponding parts throughout the several views of the drawings.

DESCRIPTION OF EXAMPLE EMBODIMENTS

Overview

In one embodiment, a method generally comprises establishing a routing protocol peer relationship and a Bidirectional Forwarding Detection (BFD) session with a neighbor node, receiving a DOWN BFD event signal from the neighbor node, and maintaining a routing protocol adjacency down state following successful exchange of routing protocol packets with the neighbor node.

In another embodiment, an apparatus generally comprises a processor configured to establish a routing protocol peer relationship with a neighbor node, establish a BFD session with the neighbor node, receive a DOWN BFD event signal from the neighbor node, and maintain a routing protocol adjacency down state following successful exchange of routing protocol packets with the neighbor node. The apparatus further comprises memory for storing a routing protocol adjacency state and a BFD state.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Embodiments described herein allow network elements to maintain protocol adjacency state when a known forwarding failure exists (e.g., via Bidirectional Forwarding Detection (BFD)) and the routing protocol packets do not share fate with the BFD packets. The embodiments described herein do not require protocol extensions, thus the embodiments are compatible with existing systems.

Figure 1:
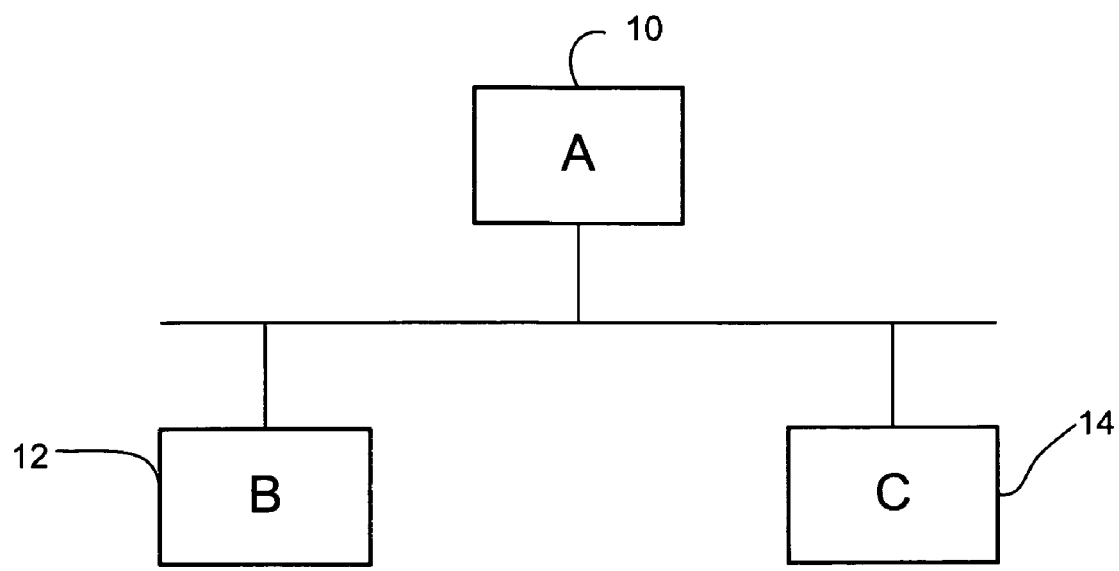
FIG. 1 illustrates an example of a Local Area Network (LAN) in which embodiments described herein may be implemented.

Referring now to the drawings, and first to FIG. 1, an example of a network that may implement embodiments described herein is shown. For simplification, only a small number of nodes are shown. The nodes may be part of a local area network (LAN), for example. The system operates in the context of a data communication network including multiple network elements. Some of the elements in a network that employs the system may be network devices such as routers or switches. The network device may include, for example, a master central processing unit (CPU), interfaces, and a bus. The CPU preferably includes memory and a processor. The network device may be implemented on a general purpose network machine such as described below with respect to FIG. 8.

The network shown in the example of FIG. 1 includes three nodes A, B, C (10, 12, 14). The nodes may be routers, switches or other network elements. Node A (10) is in communication with node B (12) and node C (14) via communication links. In the example shown in FIG. 1, only nodes A and B are configured for BFD.

Figure 2:
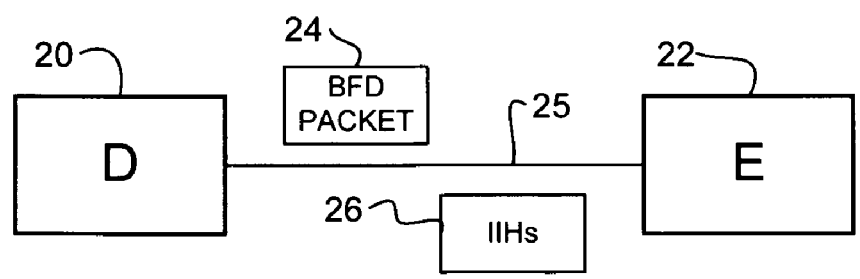
FIG. 2 illustrates an example of a point-to-point connection and the transfer of BFD packets and IS-IS Hellos (IIHs) between nodes.

FIG. 2 illustrates an example of a point-to-point (P2P) connection between two nodes D (20) and E (22). In one embodiment, the two nodes exchange BFD packets 24 over link 25 for use in failure detection. In the example shown in FIG. 2, the nodes are configured for IS-IS and exchange IIHs (IS-IS Hellos) 26. Both nodes are configured for BFD.

The networks shown in FIGS. 1 and 2 are only examples and embodiments described herein may be implemented in networks having different configurations, different types or number of nodes, or nodes operating different protocols, without departing from the scope of the invention. The embodiments described herein may be implemented in only one of the nodes (e.g., only node A in FIG. 1), with the neighbor node B configured for conventional operation. Also, the embodiments are configured to operate with a neighbor node (e.g., node C), which is not configured for BFD.

A failure monitoring session at one of the nodes may utilize BFD to notify an adjacent node of a failure. BFD allows for detection of a forwarding plane failure between two nodes. A router may use BFD to validate that a peer router's forwarding capability is functioning properly. BFD detects faults in the bidirectional path between two forwarding engines (e.g., nodes A and B in FIG. 1 or nodes D and E in FIG. 2), including physical interfaces, subinterfaces, data links, and to the extent possible the forwarding engines themselves.

The following describes an example of a process for establishing a BFD session and detecting a failure using BFD. It is to be understood that this is only one example and that setup of the BFD session may vary from that described herein without departing from the scope of the invention.

During an initial BFD session setup, BFD on each router forms a BFD control packet. These packets are sent to the neighbor (peer) node until a BFD session is established. The initial packet includes a discriminator (My Discriminator) set to a value which is unique on the transmitting router (or interface). After the remote router receives a BFD control packet during the session initiation phase, it will copy the value of the "My Discriminator" field into its own "Your Discriminator" field. Once both systems see their own discriminator in each other's control packets, the session is established. The discriminator values may also be used to multiplex/demultiplex sessions if there are multiple BFD connections between a pair of BFD peers. Once BFD has been enabled on the interfaces a BFD session is created. A stream of packets is sent from the local (originating) node, and the remote node sends the packets back to the originating node via its forwarding plane. As long as the node receives a BFD packet within a detect-timer period, the BFD session remains up. If a number of packets of the data stream are not received, the session is declared to be down.

The BFD control packet format may be as described in IETF Internet Draft "Bidirectional Forwarding Detection", draft-ietf-bfc-base-08.txt, D. Katz et al., March 2008, which is incorporated herein by reference in its entirety. The Katz et al. document is referred to herein as "BFD specification". It is to be understood that the failure detection (referred to herein as Bidirectional Forwarding Detection (BFD)) may be based on other standards or specifications without departing from the scope of the invention.

Dynamic routing protocols fall into a class of Self-Discovery BFD clients (referred to herein as SD-BFD-Clients) which have their own methods of neighbor self-discovery. Typically, such clients do not use BFD during the neighbor discovery stage but only use BFD after a peer relationship has been established. BFD is then used as a "fast down" detection mechanism.

In one embodiment, BFD sessions are not requested until after the SD-BFD-Client has established its own peer relationship with the neighbor independent of BFD. When a BFD session is reported as down, the SD-BFD-Client takes the neighbor down and destroys the BFD session.

From the BFD client point of view, there are four states for a BFD session:

1. BFD_SESSION_STATE_UNKNOWN (UNKNOWN): A BFD session has been requested by one or more clients, the identity of the neighbor is known (i.e., interface/address), but no BFD packets have ever been received from this neighbor. It is therefore unknown as to whether the lack of reception of BFD packets is due to a connectivity problem or due to the lack of configuration/support of BFD by the remote end. This is similar to the "INIT" state in the BFD specification, referenced above.
2. BFD_SESSION_STATE_UP (UP): Successful exchange of BFD packets has been achieved and continues within the intervals and methods negotiated between the BFD peers. This corresponds to the "UP" state in the BFD specification.
3. BFD_SESSION_STATE_DOWN (DOWN): Successful exchange of BFD packets has failed. This state can only be reached from the UP state. This corresponds to "DOWN" state in the BFD specification when the transition occurs for reasons other than "ADMIN_DOWN".
4. BFD_SESSION_STATE_ADMIN_DOWN (ADMIN_DOWN): BFD peer signals that it is being administratively shutdown. This corresponds to the "ADMIN_DOWN" state in the BFD specification.

In order to distinguish the above BFD states from the adjacency states described below, the BFD states are shown herein in capital letters.

Table I of FIG. 3 illustrates one example of actions taken by an SD-BFD-Client when BFD events are locally signaled.

The above functionality is sufficient as long as the fate of routing protocol packets and BFD packets are shared. Since the primary use of BFD is to protect IPv4 and IPv6 forwarding and protocols such as IS-IS do not utilize IPv4 or IPv6 for sending or receiving Hellos, it is possible that the fate of the routing protocol packets and BFD packets are not shared. If protocol packets do not share fate with BFD packets, then in cases where a BFD failure is signaled, the protocol may end up quickly restoring the neighbor session even though a known forwarding failure exists and has been reported by BFD. The following describes an example of a situation where this may occur in conventional systems.

SD-BFD-Client 20 (node D in FIG. 2) establishes a neighbor relationship with network device 22 (node E). The SFD-BFD-Client 20 then sends a BFD session request to its neighbor 22 and the BFD session comes up. If a problem which causes BFD packets 24 to be undeliverable is introduced, the BFD session goes down and is signaled to SD-BFD-Client 20. The SD-BFD-Client 20 then takes the neighbor node 22 down. If the SD-BFD-Client 20 successfully exchanges routing protocol packets with its neighbor 22, the neighbor session comes back up. The SD-BFD-Client 20 then sends a BFD session request to its neighbor 22. If the BFD session cannot come up, no UP signal is ever sent to SD-BFD-Client 20. In this case, the protocol packets do not share fate with the BFD packets, thus the protocol may restore the neighbor session even though a known forwarding failure exists.

The above scenario may occur, for example, in networks running IS-IS protocol. In one example, a QoS policy is introduced which blocks IP ingress packets, but does not affect IS-IS PDUs (protocol data units).

The embodiments described herein address the situation in which routing protocol packets do not share fate with forwarding detection packets. In one embodiment, changes are made to the adjacency state machine, as described in detail below. The following example uses IS-IS, however, similar logic may be applied to other protocols (e.g., OSPFv3 used to support IPv4). The changes described herein are local changes which do not require protocol extensions (i.e., they do not introduce protocol interoperability issues).

Conventional systems utilize three adjacency states:
1. Down: Initial adjacency state.
2. Initializing: A packet has been received from a neighbor but the node does not know whether the neighbor is receiving its packets.
3. Up: The node knows that the neighbor is receiving its packets.

These states may correspond, for example, to the three states described in RFC 3373, "Three-Way Handshake for Intermediate System to Intermediate System (IS-IS) Point-to-Point Adjacencies", D. Katz et al., September 2002, which is incorporated herein by reference in its entirety.

In one embodiment, two new adjacency states are utilized (in addition to the three states previously described):

4. Up-BFD: This state is entered when an IS-IS adjacency is in the Up or Down-BFD state and a BFD UP event is signaled. Operation of the protocol in this adjacency is the same as the Up state except that future BFD session state change signals may affect the state of the adjacency.

5. Down-BFD: This state is entered when a BFD session DOWN is signaled to IS-IS for a neighbor with whom the node has an adjacency in the Up-BFD state. Operation of the protocol in this state is the same as the Initialize state except as described below.

Table II of FIG. 4 is a state table illustrating changes in state based on BFD events. The first column lists adjacency states: Down, Initializing, Up, Up-BFD, and Down-BFD. The top row of the table lists BFD events received at the client (DOWN, UP, or ADMIN_DOWN). The table shows changes in state at the client upon receiving a BFD event. For example, if the client node is in Down state, it will remain in Down state if a DOWN, UP, or ADMIN_DOWN BFD event is received. If the client node is initializing, it continues to initialize even if a DOWN, UP, or ADMIN_DOWN BFD event is received. If the client node is in the Up state, it will remain in Up state if a DOWN or ADMIN_DOWN BFD event is received. A DOWN BFD event received when the adjacency state is Up is ignored because unless an Up event has previously been received from BFD, the protocol does not know whether the BFD session was ever Up. If an UP BFD event is received while the client is in Up state, the node will change its state to Up-BFD.

If the client node is in Up-BFD or Down-BFD state and receives a DOWN BFD event, it will switch to (or remain in) Down-BFD state. If an UP BFD event is received while the node is in Up-BFD or Down-BFD adjacency state, the node will switch to (or remain in) Up-BFD state. If an ADMIN_DOWN BFD event is received, the node will switch to Up state.

The following provides details of operation using the above-described states for P2P circuits and LAN circuits.

Table III of FIG. 5 is a state table illustrating the processing of received three-way states. For P2P circuits, the three-way state is advertised in the IIHs. For LAN circuits, there is no three-way state advertised in the LAN IIHs, however, the equivalent functionality is derived from the verification of two-way connectivity via the IS-Neighbor advertisements in LAN IIHs. The left column in the table lists the adjacency three-way state at the SD-BFD-Client node. The states include Down, Initializing, Up, and the two new states; Up-BFD and Down-BFD. The top row of the table lists received adjacency three-way states (Down, Initializing, Up). When the client node is in Down, Initializing, or Up adjacency state, the changes in state are the same as described in RFC 3373 (referenced above). Changes in state for Up-BFD are the same as for Up state. Operation when the node is in Down-BFD state is described below with respect to the flowchart of FIG. 7.

Figure 6:
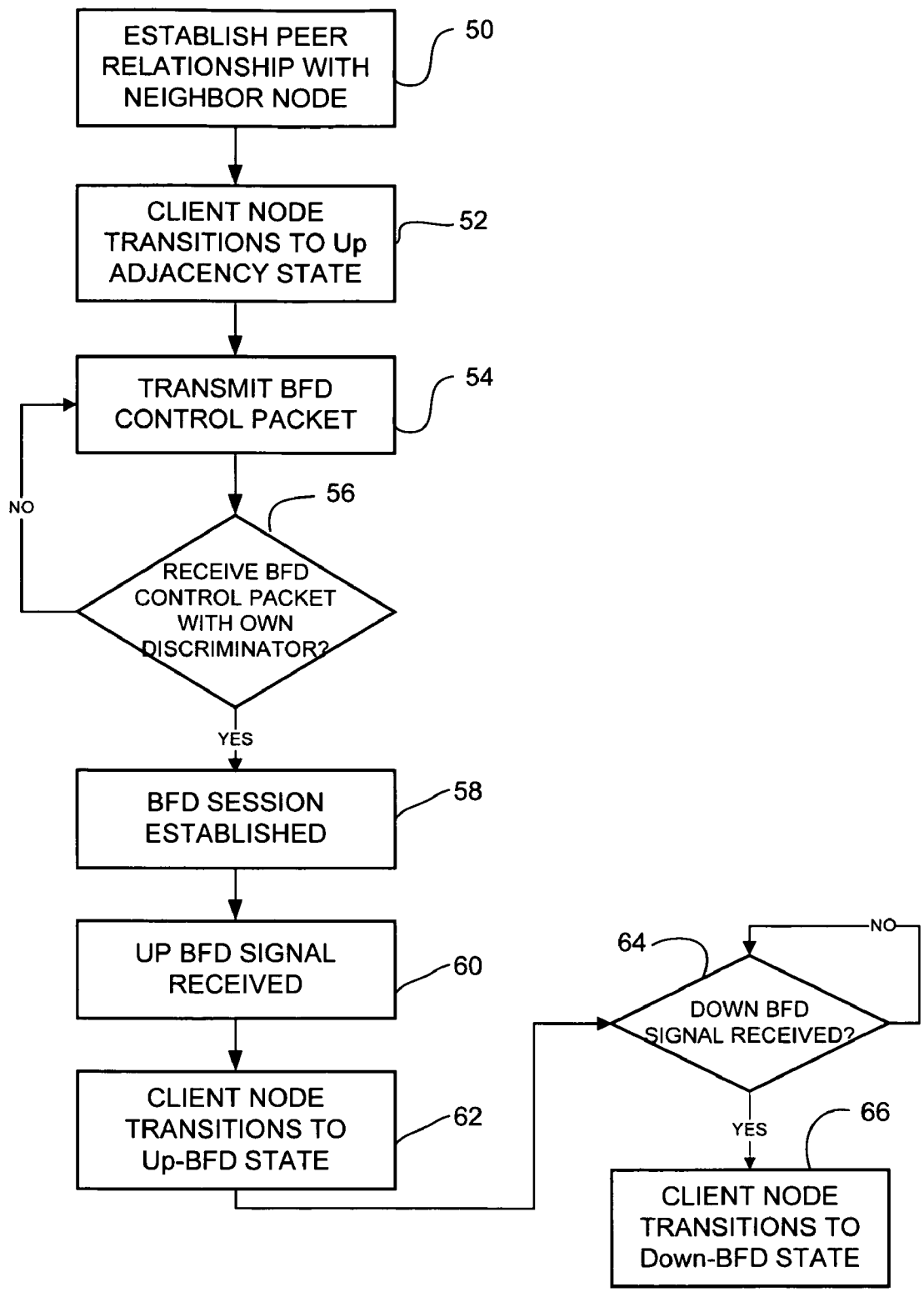
FIG. 6 is a flowchart illustrating a process for establishing a protocol adjacency and BFD session and the processing of BFD events.

FIG. 6 is a flowchart illustrating a process for establishing protocol adjacency and a BFD session with a neighbor node and processing BFD events received from the neighbor node. At step 50, the client node establishes a routing protocol peer relationship (adjacency) with the neighbor node. As previously described, the peer relationship may be an IS-IS, OSPF, or other routing protocol adjacency. The client node enters an Up adjacency state (step 52). BFD control packets are transmitted at step 54. If a BFD packet containing the client node's own discriminator is received at step 56, the BFD session is established (step 58). A BFD UP signal is received at step 60 and the client node transitions from Up adjacency state to Up-BFD adjacency state (step 62). If a DOWN BFD event is received at the client node (step 64), the client node transitions to a routing protocol adjacency down state (Down-BFD) (step 66). Further state transitions are listed in Table II.

Figure 7:
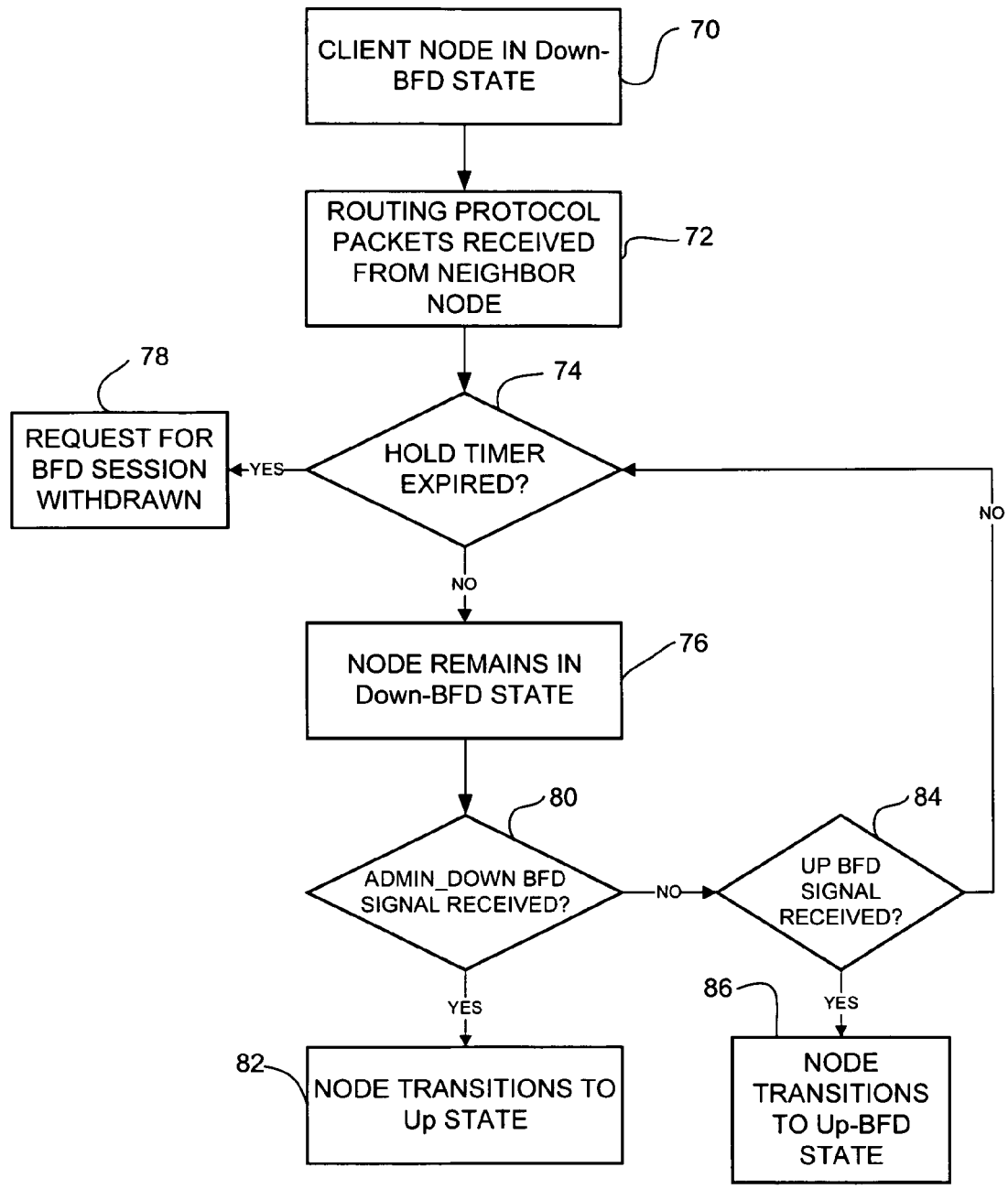
FIG. 7 is a flowchart illustrating a process for maintaining protocol adjacency state.

FIG. 7 is a flowchart illustrating a process for maintaining protocol adjacency state at the client node following a forwarding failure indication from BFD. At step 70, the client node is in a routing protocol adjacency down state (Down-BFD). Routing protocol packets (e.g., IIHs, OSPF) are received from the neighbor node with the same systemID at step 72. In P2P circuits, IIHs from a neighbor with the same systemID and Extended Local Circuit ID are used to update a hold timer on the adjacency, regardless of the three-way state in IIHs received from the neighbor. In LAN circuits, IIHs from the neighbor with the same systemID and SNPA (Subnetwork Points of Attachment) address as the existing adjacency are used to update the hold timer on the adjacency. As long as the hold timer does not expire, the local state remains in the routing protocol adjacency down state (Down-BFD) (steps 74 and 76). If the hold timer expires, the adjacency is destroyed and the request for BFD session is withdrawn from the local BFD (step 78). If an ADMIN_DOWN BFD event is signaled (step 80), it indicates that BFD support is being removed from the neighbor and the routing protocol (e.g., IS-IS) should therefore ignore BFD state. The adjacency transitions to Up state at step 82. If an UP BFD signal is received at step 84, the node transitions to Up-BFD adjacency state (step 86).

It is to be understood that the above described process is only an example and that the steps shown may be modified, rearranged, or deleted, or additional steps added, without departing from the scope of the invention.

The embodiments described above handle the case where a forwarding failure which does not affect IS-IS PDUs occurs after an IS-IS adjacency is up and the BFD session has been successfully established. However, it is also possible for the fate sharing problem to exist prior to initial adjacency establishment. In this case, the IS-IS adjacency is established and routes which cannot be used for forwarding IP packets may be entered into the RIB (routing information base)/FIB (forwarding information base). In order to prevent this from happening, it would be helpful to know whether both the IS-IS peers are configured to use BFD. A protocol extension, such as described in IETF draft-ietf-isis-bfd-tlv-01.txt, C. Hopps et al., Mar. 23, 2008, which is incorporated herein by reference in its entirety, may be used to allow IS-IS to advertise its support for BFD on each circuit. Another option is to introduce a state configuration.

Figure 8:
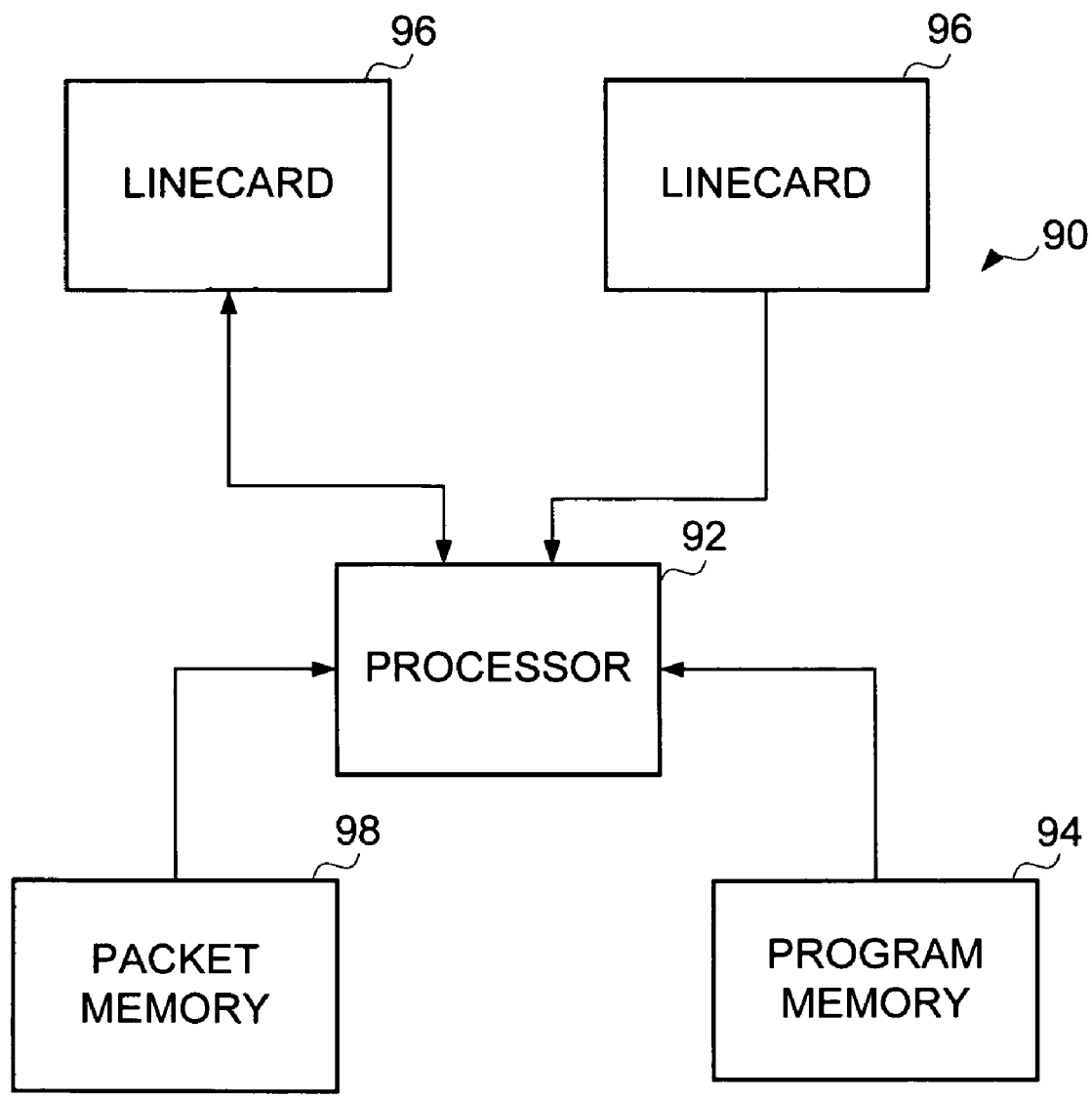
FIG. 8 depicts an example of a network device useful in implementing embodiments described herein.

FIG. 8 depicts a network device 90 that may be used to implement embodiments described herein. Network device 90 is configured to implement all of the network protocols and extensions thereof described above. In one embodiment, network device 90 is a programmable machine that may be implemented in hardware, software, or any combination thereof. Logic may be encoded in one or more tangible media for execution by a processor. For example, processor 92 may execute codes stored in a program memory 94. Program memory 94 is one example of a computer-readable medium. Program memory 94 can be a volatile memory. Another form of computer-readable medium storing the same codes is a type of non-volatile storage such as floppy disks, CD-ROMs, DVD-ROMs, hard disks, flash memory, etc.

Network device 90 interfaces with physical media via a plurality of linecards 96. State machines may be implemented on the linecards 96 and may be embodied in software, hardware, firmware, or another machine-readable form. Linecards 96 may incorporate Ethernet interfaces, DSL interfaces, Gigabit Ethernet interfaces, 10-Gigabit Ethernet interfaces, SONET interfaces, etc. As packets are received, processed, and forwarded by network device 90, they may be stored in a packet memory 98. To implement functionality according to the system, linecards 96 may incorporate processing and memory resources similar to those discussed above in connection with the network device as a whole. It is to be understood that the network device 90 shown in FIG. 8 and described above is only one example and that different configurations of network devices may be used.

As can be observed from the foregoing, the embodiments described herein provide numerous advantages. For example, the embodiments described herein do not require protocol extensions so that they are usable with legacy implementations.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   establishing at a client node, a routing protocol peer relationship with a neighbor node and entering an up adjacency state at the client node;
   establishing a Bidirectional Forwarding Detection (BFD) session with the neighbor node and changing said adjacency state at the client node from up to up-BFD;
   receiving a DOWN BFD event signal from the neighbor node;
   changing said adjacency state at the client node from up-BFD to down-BFD; and
   maintaining a routing protocol adjacency down state at the client node following successful exchange of routing protocol packets with the neighbor node.

2. The method of claim 1 wherein establishing a routing protocol peer relationship comprises transmitting Intermediate System-to-Intermediate System Hello packets.

3. The method of claim 1 wherein establishing a routing protocol peer relationship comprises transmitting Open Shortest Path First packets.

4. The method of claim 1 further comprising destroying said routing protocol peer relationship following expiration of a hold timer.

5. The method of claim 4 further comprising withdrawing a request for a BFD session.

6. The method of claim 1 further comprising receiving an ADMIN_DOWN BFD signal and transitioning said routing protocol adjacency down state to an Up state.

7. The method of claim 1 wherein establishing said BFD session comprises receiving an UP BFD signal from the neighbor node.

8. The method of claim 1 further comprising receiving an UP BFD event signal from the neighbor node and changing said adjacency state to up-BFD.

9. An apparatus comprising:
   a processor configured to establish a routing protocol peer relationship with a neighbor node and enter an up adjacency state, establish a Bidirectional Forwarding Detection (BFD) session with the neighbor node and transition to an up-BFD adjacency state, receive a DOWN BFD event signal from the neighbor node and transition to a down-BFD adjacency state, and maintain a routing protocol adjacency down state following successful exchange of routing protocol packets with the neighbor node; and
   memory for storing a routing protocol adjacency state and a BFD state.

10. The apparatus of claim 9 wherein the routing protocol peer relationship is an Intermediate System-to-Intermediate System adjacency.

11. The apparatus of claim 9 wherein the routing protocol peer relationship is an Open Shortest Path First adjacency.

12. The apparatus of claim 9 further comprising a hold timer, wherein the processor is configured to destroy said routing protocol peer relationship following expiration of said hold timer.

13. The apparatus of claim 12 wherein the processor is configured to withdraw a request for a BFD session following expiration of said hold timer.

14. The apparatus of claim 9 wherein the processor is configured to transition said routing protocol adjacency down state to an Up state upon receiving an ADMIN_DOWN BFD signal.

15. The apparatus of claim 9 wherein the routing protocol adjacency states comprise down, initializing, up, up-BFD, and down-BFD.

16. An apparatus comprising:
   means for establishing at a client node, a routing protocol peer relationship with a neighbor node and entering an up adjacency state at the client node;
   means for establishing a Bidirectional Forwarding Detection (BFD) session with the neighbor node and changing said adjacency state at the client node from up to up-BFD;
   means for receiving a DOWN BFD event signal from the neighbor node and changing said adjacency state at the client node from up-BFD to down-BFD; and
   means for maintaining a routing protocol adjacency down state at the client node following successful exchange of routing protocol packets with the neighbor node.

17. The apparatus of claim 16 wherein means for establishing a routing protocol peer relationship comprises means for transmitting Intermediate System-to-Intermediate System Hello packets.

18. The apparatus of claim 16 wherein means for establishing a routing protocol peer relationship comprises means for transmitting Open Shortest Path First packets.

19. The apparatus of claim 16 further comprising means for destroying said routing protocol peer relationship and withdrawing a request for a BFD session following expiration of a hold timer.

20. The apparatus of claim 16 further comprising means for receiving an ADMIN_DOWN BFD signal and transitioning said routing protocol adjacency down state to an Up state.

* * * * *